United States Patent [19]

Lee et al.

[11] Patent Number: 4,500,592
[45] Date of Patent: Feb. 19, 1985

[54] COMPOSITE THERMAL INSULATION LINER

[75] Inventors: Calvin K. Lee, Needham; Deirdre T. Rapacz, Natick, both of Mass.

[73] Assignee: The United States of America as represented by the Secretary of the Army, Washington, D.C.

[21] Appl. No.: 623,755

[22] Filed: Jun. 22, 1984

[51] Int. Cl.³ ............................................... B32B 7/00
[52] U.S. Cl. ................................. 428/251; 428/102; 428/218; 428/246; 428/920
[58] Field of Search .............. 428/919, 920, 102, 219, 428/246, 251, 458, 284, 285, 287, 218

[56] References Cited

U.S. PATENT DOCUMENTS

| | | | |
|---|---|---|---|
| 3,669,816 | 6/1972 | Smith et al. | 428/259 |
| 3,993,828 | 11/1976 | McCorsley | 428/251 |
| 4,105,819 | 8/1978 | Hotcharian | 428/251 |
| 4,302,496 | 11/1981 | Donovan | 428/290 |
| 4,400,420 | 8/1983 | Bakken et al. | 428/251 |

*Primary Examiner*—James J. Bell
*Attorney, Agent, or Firm*—Anthony T. Lane; Robert P. Gibson; Mark Goldberg

[57] ABSTRACT

A tent insulation liner which functions to both retain heat within the tent during the winter heating season and reduce the external heat load during the summer air conditioning season. The liner is positioned on the interior side of an outer tent shell and is formed by alternating plies of fibrous flame retardant (FR) polyester batting, metallic reflective film and fibrous FR polyester batting and having fiberglass fabric as external cover layers. Optimum insulative properties were found to occur when a three-ply quilting arrangement was employed in which each fiberglass fabric layer was quilted to the adjacent FR batting layer and the two metallic film layers were quilted together with a FR batting layer between.

15 Claims, 2 Drawing Figures

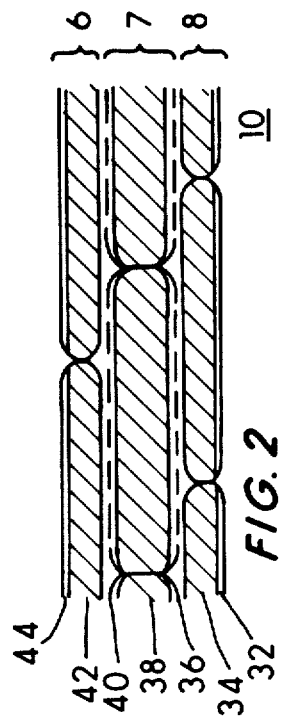
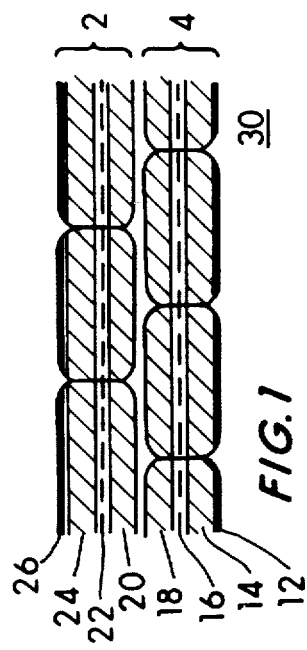

COMPOSITE THERMAL INSULATION LINER

The invention described herein may be manufactured, used and licensed by or for the Government for governmental purposes without the payment to us of any royalty thereon.

BACKGROUND OF THE INVENTION

Current tentage is generally made without thermal insulation protection. A need exists for an insulation liner for air conditioned and heated tents to be utilized as mobile field hospitals. It was initially determined that this insulation liner should provide a 6.0 R value (°F.-hr-ft$^2$/BTU) of insulation based upon the thermal loads expected and the cooling capacity of the air conditioner to be utilized. In addition to the insulation properties, a thermal insulation liner should be of minimal weight and thickness, with low moisture absorption. The initial approach tried in developing a thermal insulation liner was to employ a system including synthetic microfiber battings. Microfibers with diameters less than 10 micrometers reduce radiation heat flow to a greater extent than regular fibrous batting materials comprised of fibers having a diameter of about 25 micrometers. A liner consisting of cover fabrics together with insulative layers of synthetic microfiber battings more than met the desired insulation requirements, but the synthetic microfibers are high in cost and the liner employing it had a greater weight per unit area than desired.

Further research led to the novel thermal insulation liner of the instant invention which is 40% lighter in weight than the above-described microfiber batting liner. The liner of this invention provides optimum insulative properties through the use of radiant heat reflective plies together with low density flame retardant polyester batting. Additionally, this liner provides good flame resistance through use of fiberglass cover fabrics and the flame retardant batting.

SUMMARY OF THE INVENTION

The present invention provides a fibrous-reflective composite insulation liner for use with a tent. The insulation liner functions to both retain heat within the tent during the winter heating season and reduce the external heat load during the summer air conditioning season. The liner is formed by alternating plies of fibrous flame retardant (FR) polyester batting, a metallic reflective film, fibrous FR polyester batting, metallic reflective film and fibrous FR polyester batting and having fiberglass fabric (FR) as external cover layers. The liner is intended to be positioned on the interior side of an outer tent shell. The fiberglass fabric positioned adjacent to the tent shell is vapor permeable to allow for evaporation of moisture within the insulation structure while the fiberglass fabric on the inside of the tent is an impermeable vapor barrier which may be wiped clean when it becomes soiled.

BRIEF DESCRIPTION OF THE DRAWINGS

FIG. 1 is a cross sectional view of the insulation liner of this invention described in Example 1.

FIG. 2 is a cross sectional view of the insulation liner of this invention described in Example 2.

DETAILED DESCRIPTION

The thermal insulation liner of this invention involves the combination of reflective materials with spacer batting materials to provide thermal insulation to tentage both for summer and winter use. The tent in which this liner is expected to be used will have the capabilities to be air conditioned and heated when necessary. The liner consists of a composite of flame retardant (FR) polyester batting layers together with metallic film reflective layers and having an inner and outer fiberglass fabric cover. These reflective layers allow for the production of a much less bulky liner than would otherwise be possible. The composite liner provides an R value of about 6 °F.-hr-ft$^2$/BTU which is adequate insulation for air conditioning to be employed for cooling the tent. It has an average weight of about 20.0 oz/yd$^2$.

FIGS. 1 and 2 illustrate cross sections of the insulation liner of the present invention. The liner is of essentially symmetrical construction. The outer plies should be a lightweight, durable fabric which protects the internal plies from damage. A ply of permeable fiberglass fabric is used as the outer ply which allows for the evaporation of condensation and any other ambient moisture which may penetrate the insulation system. Evaporation of such moisture is essential for maximum insulation efficiency. Next to the fiberglass ply is a first ply of highly porous, low bulk density FR polyester regular fiber batting which typically has an areal density of 2 ounces per square yard. This first batting ply acts as a filter to prevent dust and foreign particles from depositing on the shiny reflective surface, so that high reflectivity can be maintained. This first ply serves as a spacer material which is sufficiently thin so that radiation heat may be reflected by the reflective surfaces with minimal heating of the batting ply. Adjacent to the batting ply is a first ply of metallic reflective film. The middle of the composite insulation liner consists of four ounce per square yard FR polyester regular fiber batting. Two plies of 2 oz/yd$^2$ FR polyester regular fiber batting may be substituted for the 4 oz/yd$^2$ ply as in FIG. 1. On the other side of this batting is a second ply of metallic reflective film. Next to the second ply of metallic reflective film is a second ply of FR polyester regular fiber batting having an areal density of 2 ounces per square yard. The inner ply of the liner is a ply of fiberglass fabric. This inner ply should be impermeable to moisture to allow it to be washed or wiped off as necessary. The liner is too large an item to be laundered, which makes it essential that the inner surface be washable. The method of construction and materials used to prepare the composite liner are set forth in the following two Examples. The principal difference between the embodiments of the invention as described in Examples 1 and 2 lies in the manner in which the layers are quilted together.

EXAMPLE 1

FIG. 1 shows the composite insulation liner with the individual component plies quilted into two composite layers 2 and 4 which are identical except for the use of a permeable surface on one side of the liner and an impermeable surface on the other side. Ply 12 faces the outside of a tent and is a Type C filament fiberglass of single warp and filling yarns in a plain weave construction with a 4 oz/yd$^2$ base fabric weight. The fiberglass fabric has been treated with a urethane-acrylic aqueous polymer mixture containing water repellent silicons and flame retardant elements. Ply 12 is permeable to air with an air permeability of at least 5.5 ft$^3$/min/ft$^2$. The coated fiberglass fabric weighs about 5.0 oz/yd$^2$. One such fabric is the Sandel poplin weave 100% coated fiberglass fabric manufactured by Fire Safe Products of New York, N.Y. Adjacent to the fiberglass fabric is ply 14 of highly porous low bulk density flame retardant (FR) polyester regular fiber batting which typically has an areal density of 2.0 oz/yd$^2$. The fiber used in fabricating the batting should be inherently flame retardant virgin polyester manufactured from polyethylene teraphthalate resin modified by phosphorus compounds which are reacted and incorporated into the polyethylene teraphthalate polymer chain. The fibers do not support combustion. These fibers are bonded with a durable flame resistant bonding agent uniformly applied to both sides. The concentration of the applied bonding agent is about 18% on the weight of the finished bonded cut staple bonding. One such batting is the Star Flame Retardant Polyester Batting S/110582-Z, 75% Hoescht 271/25% Hoescht 873 treated with an antiblaze acrylic resin manufactured by Star Textile & Research Co. of Albany, N.Y. A reflective metallic film is employed as ply 16. This highly reflective ply has a 75 gage, low density polyethylene film base with 99.9% pure aluminum vapor deposited on the base. The metallized film is topcoated with an electron beam curable acrylate epoxy coating to provide abrasion resistance for the aluminum coating. The film, weighing about 0.5 oz/yd$^2$, is about 0.75 mils thick and may be obtained from Metallized Products of Winchester, MA. Plies 18 and 20 are fibrous batting layers of the same material as ply 14. Plies 12, 14, 16 and 18 are quilted into ten inch wide channels to hold the plies together and comprise composite layer 4.

The other half of the lining, composite layer 2, consists of plies 20, 22, 24 and 26 which are also quilted into ten inch wide channels. The quilted lines of each composite layer are spaced apart so as to minimize cold spots created by the stitching. The quilt stitch pattern is an offset straight channel quilt pattern. Plies 20 and 24 are of the same FR polyester batting as that used in plies 14 and 18. Reflective metallic film ply 22 is identical to that used in ply 16. If the metallic film had only one highly reflective side, the reflective side of ply 16 would face ply 14 and the reflective side of the ply 22 would face ply 24. Ply 26 is an impermeable fiberglass fabric made from the same base fabric as layer 12 but made with a sufficient amount of the coating compound to limit air permeability to a maximum of 1.0 ft$^3$/min/ft$^2$. Since the fiberglass fabric 26 is an impermeable fabric facing the interior of the tent, it may be washed easily. Permeable layer 12 allows the evaporation of any moisture which has penetrated the insulation liner. The fiberglass plies afford some structural strength to the liner as well as protecting the inner plies from wear. All of the components of the thermal insulation liner except the reflective film plies are inherently flame retardant. The batting and fiberglass cover fabrics have base materials which are inherently flame resistant. The finishes used on the fiberglass fabrics have a fire resistant finish or component. The fire resistance of the liner as a whole has met the standards of Federal Standard 191 Flammability Test Methods 5903 and 5905.

EXAMPLE 2

FIG. 2 shows the composite insulation liner described below. The main difference from the liner shown in FIG. 1 is in the quilting arrangement to produce three composite layers 6, 7 and 8 instead of the two composite layers as in Example 1. Fiberglass ply 32 is quilted to FR polyester batting ply 34 and fiberglass ply 44 in quilted to FR polyester batting ply 42. Three plies 36, 38 and 40 are quilted together. Eight inch channels are formed by the quilting and the quilted lines of each layer are staggered to eliminate cold spots created by the stitching. In addition to the quilting arrangement, Example 2 differs from Example 1 in the substitution of one ply 38 of four ounce per square yard FR polyester batting for the plies 18 and 20 of EXAMPLE 1. The 4 oz/yd$^2$ batting is manufactured in a similar manner as the 2 oz/yd$^2$ batting. Ply 38 provides very nearly the same insulation capacity as plies 18 and 20 of the two ounce batting used in Example 1.

The symmetrical reflective plies in both examples cause the liner to be effective for both cooling and heating applications. The liner will normally be used in combination with an exterior tent shell and an interior FR cotton liner. There should be about a two inch air space between the shell and the interior cotton liner. The exterior tent shell may be heated by the ambient air and by solar radiation. Due to solar heating the equilibrium fabric temperature will usually be higher than the ambient fabric temperature. It is not unusual for the fabric temperature to rise 40° F. on a sunny day. Without the reflective layers the generally high fabric emissivity results in significant flow of radiation heat into the tent on warm days. Aluminized film offers the capacity for reflecting incident radiation and provides a low level of emitted radiation. Reflective plies 16 or 36 reflect radiation emitted from the external fiberglass fabric plies 12 or 32. The batting plies provide most of the insulation against conductive and convective heat loss. This composite insulation liner is the first to be designed to reduce the heat load and thereby allow for efficient operation of the air conditioning units to be installed in those tents situated in warm environments.

The tent insulation liner is intended to be used in tents which are subject to four season use, from arctic to tropical climates. In addition to the warm weather functioning of the insulation liner described above, the liner retains heat inside the tent through the winter. Inner reflective film plies 22 or 40 reduce the energy required to heat the tent by reflecting internally generated heat back into the tent. The liner manufactured as in Example 1 will come from the factory as composite layers 2 and 4 which will be stitched together as required to fabricate the end item liner.

Due to the fact that the insulation liners of Examples 1 and 2 differ only in the substitution of one middle ply of FR polyester batting for the two plies in Example 1 and in the quilting arrangement, the thickness, density and R values for the respective liners are nearly identical. The thickness is in the range of 1.5 to 1.75 inches and the areal density is in the range of 18.0 to 19.0 oz/sq yd. The R values for Example 1 were 5.5 °F.-hr-ft$^2$/BTU for heating and 6.0 °F. hr-ft$^2$/BTU for cooling while in Example 2 the R values were 5.7 °F.-hr-ft$^2$/BTU for heating and 6.4 °F. hr-ft$^2$/BTU for cooling. The measurements of R value were made using a combination of the liner with the outer tent wall spaced two inches from the liner. Further testing proved that the use of two reflective metallic layers in the insulation liner of this invention provided unexpectedly significantly more insulation than test liners provided with only one reflective layer. It is calculated that an R value of 0.4 °F.-hr-ft$^2$/BTU contributed from the stationary layers adjacent to the tent wall could be added to the calculated figures when the insulation liner is used with the tent. Modifications of the liner of Example 1 were tested with only one reflective layer in place. When metallic film ply 16 was removed, the liner produced an R value of 5.47 °F.-hr-ft$^2$/BTU for heating and an R value of 4.84 °F.-hr-ft$^2$/BTU for cooling. In testing of an insulation liner missing reflective ply 22 of the liner of Example 1, the R values produced were 5.57 °F.-hr-sq ft/BTU for heating and 4.85 °F.-hr-ft$^2$/BTU for cooling. These tests demonstrate the significant and unexpected benefit provided by the double metallic film ply application. This advantage is provided with minimal added weight and thickness since the metallic film is only about 0.5 oz/yd$^2$.

The thermal insulative performance properties of the liners of Examples 1 and 2 were determined in accordance with standard test ASTM C 518, "Steady State Thermal Transmission Properties by Means of a Heat Flow Meter." A Dynatech R&D Co., Model Rapid K Thermal Conductivity Instrument was used for the evaluation. The apparatus test chamber opening was maintained at two inches based on the calculation of the average distance between the tent shell and the interior cotton tent liner which is where the insulative liner would be positioned. The apparatus consists of two parallel plates whose temperatures are controlled based on the desired test temperature conditions. In this evaluation, the top plate denoted as T$_h$, was covered with the tent shell material simulating the external tent shell surface temperature and the bottom plate, denoted as T$_C$, was covered with the cotton liner material representing the air temperature within the tent. This simulated insulated tent wall was evaluated in one or both of the following test temperature conditions:

|  | T$_h$ | T$_c$ |
| --- | --- | --- |
| Cooling: Summer Air conditioning | 120° F. | 72° F. |
| Heating: Winter Heated Condition | 32° F. | 72° F. |

The test results described above demonstrate that the concept of utilizing a 2 oz/yd$^2$ FR polyester batting ply between the reflective films and the cover fabrics serves to maximize the effective reflectivity of the film, while providing additional insulation from the batting material. Furthermore, the two reflective layers, positioned close to the external and internal heat sources best serve to minimize radiation heat gain and loss, respectively. This liner affords similar insulation properties to those made from microfiber batting without reflective films at a 40% reduction in weight and a significant reduction in cost of materials. The composite liner of this invention is lightweight and is easy to handle which is an important consideration since the liner was developed for use in 8 feet×32 feet sections. Additionally, the fibrous-reflective system provides good flame resistance properties.

The insulation liners described above are only two of the embodiments which could provide the desired level of insulation. Slight construction pattern modifications may be necessary in order to accommodate commercial fabrication processing. Other modifications, such as the substitution of other reflective materials for those described above, could be made as long as similar reflective properties could be obtained. In situations where greater insulation is required, a heavier liner could be substituted in exchange for a loss of lightweight characteristics.

We claim:

1. A thermal insulation liner comprising a plurality of reflective film plies, a plurality of fibrous flame retardant batting plies and two outer woven glass fabric cover plies wherein at least one batting ply lies between each of said outer cover plies and said reflective plies.

2. The insulation liner according to claim 1 wherein the insulation R value of said liner is about 6 °F.-hr-ft$^2$/BTU when said R value is measured with said liner spaced about 2 inches from an outer tent wall.

3. The insulation liner according to claim 2 wherein said reflective film plies are metallic coated film.

4. The insulation liner according to claim 3 wherein said reflective metallic film is an aluminized low density polyethylene film.

5. The insulation liner according to claim 4 wherein the batting plies are highly porous, low bulk density, flame retardant polyester regular fiber batting.

6. The insulation liner according to claim 5 wherein there are two reflective metallic plies, each of said reflective plies being spaced from the cover plies by a ply of flame retardant polyester batting.

7. The insulation liner according to claim 6 wherein there is situated between said reflective metallic plies a ply of flame retardant polyester batting which is at least twice the areal density of the flame retardant polyester batting plies which space the cover layers from the metallic layers.

8. The insulation liner according to claim 7 wherein said cover plies are a woven fiberglass coated fabric.

9. The insulation liner according to claim 8 wherein the fiberglass cover fabric facing the interior of a tent is impermeable to moisture and the fiberglass cover fabric facing the exterior of the tent is permeable to moisture.

10. The insulation liner according to claim 9 wherein the plies of said liner are arranged in the following order: a protective ply of moisture impermeable fiberglass fabric, a first ply of flame retardant polyester batting, a ply of aluminized low density polyethylene film, a second ply of flame retardant polyester batting approximately twice as thick as said first ply of flame retardant polyester batting, a second ply of aluminized low density polyethylene film, a third ply of flame retardant polyester batting approximately the same thickness as said first ply of batting and a second protective ply of moisture vapor permeable fiberglass fabric.

11. The insulation liner according to claim 10 wherein said first ply and said third ply of flame retardant polyester batting each have an areal density of about 2 oz/yd$^2$ and said second ply of flame retardant polyester batting has an areal density of about 4 oz/yd$^2$.

12. The insulation liner according to claim 11 wherein all of said plies except for said plies of aluminized low density polyethylene film are flame resistant.

13. The insulation liner of claim 12 wherein said second ply of flame retardant polyester batting comprises two plies of said first or third flame retardant polyester batting.

14. The insulation liner according to claim 13 wherein the components of said liner are quilted into two layers of equal areal density.

15. The insulation liner according to claim 12 wherein the components of said liner are quilted into three layers, two of said layers comprising an outer ply of fiberglass fabric and the adjacent ply of flame retardant polyester batting and the middle layer of said three layers comprising the two metallic reflective plies with the ply of flame retardant polyester batting between said reflective plies.

* * * * *